United States Patent
Kapchie et al.

(10) Patent No.: US 9,980,500 B2
(45) Date of Patent: May 29, 2018

(54) LIQUID CREAMER COMPOSITION COMPRISING OLEOSOMES AS REPLACEMENT FOR OIL AND METHOD OF USING SAME

(71) Applicant: NESTEC S.A., Vevey (CH)

(72) Inventors: Virginie Kapchie, Dublin, OH (US); Jean-Baptiste Bezelgues, Beijing (CN); Christian Milo, Dublin, OH (US); Martin Erwin Leser, Dublin, OH (US); Alexander A. Sher, Dublin, OH (US)

(73) Assignee: Nestec S.A., Vevey (CH)

( * ) Notice: Subject to any disclaimer, the term of this patent is extended or adjusted under 35 U.S.C. 154(b) by 219 days.

(21) Appl. No.: 14/774,561

(22) PCT Filed: Mar. 27, 2014

(86) PCT No.: PCT/EP2014/056110
§ 371 (c)(1),
(2) Date: Sep. 10, 2015

(87) PCT Pub. No.: WO2014/154780
PCT Pub. Date: Oct. 2, 2014

(65) Prior Publication Data
US 2016/0015049 A1    Jan. 21, 2016

Related U.S. Application Data

(60) Provisional application No. 61/806,183, filed on Mar. 28, 2013, provisional application No. 61/806,181, filed on Mar. 28, 2013.

(51) Int. Cl.
| | | |
|---|---|---|
| A23F 5/24 | (2006.01) | |
| A23F 3/16 | (2006.01) | |
| A23C 11/08 | (2006.01) | |
| A23G 1/32 | (2006.01) | |

(52) U.S. Cl.
CPC ........... A23C 11/08 (2013.01); A23F 3/163 (2013.01); A23F 5/243 (2013.01); A23G 1/32 (2013.01)

(58) Field of Classification Search
CPC .......... A23C 11/08; A23F 3/163; A23F 5/243; A23G 1/32
See application file for complete search history.

(56) References Cited

U.S. PATENT DOCUMENTS

| | | | | |
|---|---|---|---|---|
| 4,415,600 A | * | 11/1983 | Miller | A23L 29/10 426/471 |
| 6,183,762 B1 | | 2/2001 | Deckers et al. | |
| 2006/0029713 A1 | * | 2/2006 | Eckert | A23C 9/1504 426/581 |
| 2007/0207254 A1 | | 9/2007 | Crank | |
| 2012/0295009 A1 | | 11/2012 | Napolitano et al. | |
| 2014/0024714 A1 | * | 1/2014 | Wijesundera et al. | A61K 8/553 514/560 |
| 2014/0045940 A1 | * | 2/2014 | Gray | A61K 8/922 514/560 |

FOREIGN PATENT DOCUMENTS

| | | | |
|---|---|---|---|
| CA | 2826629 | * | 8/2012 |
| JP | H06303901 | | 11/1994 |
| JP | 2003274882 | | 9/2003 |
| WO | WO 98/53698 | * | 12/1998 |
| WO | 2004030464 | | 4/2004 |
| WO | WO2012146777 | * | 11/2012 |
| WO | 2013006045 | | 1/2013 |
| WO | 2013092693 | | 6/2013 |

OTHER PUBLICATIONS

Kapchie et al. Journal of Food Science. vol. 76. Jun. 2011. pp. C853-C860.*
Whole Milk. USDA National Nutrient Database, Release 28. 2016. https://ndb.nal.usda.gov/ndb/foods/show/70.*
Tzen et al. Plant Physiology. 1993. vol. 101. pp. 267-276.*
Whole Wheat Flour. USDA Branded Food Products Database. 2017. https://ndb.nal.usda.gov/ndb/foods/show/63527.*
Dairy Food Science Notes. Cornell University. Oct. 10, 2007. 2 pages.*
Office Action for corresponding Japanese application No. P2016-504666; dated Jan. 26, 2018; (8 pages).

* cited by examiner

*Primary Examiner* — Anthony Weier
(74) *Attorney, Agent, or Firm* — K&L Gates LLP

(57) ABSTRACT

The present invention relates to a creamer composition, e.g. for use for addition into a coffee beverage, having good physical and chemical stability, in particular the invention relates to a liquid creamer composition including protein, oleosomes and optionally oil. The invention also relates to a beverage composition including the liquid creamer composition, and a method of making it.

17 Claims, 1 Drawing Sheet

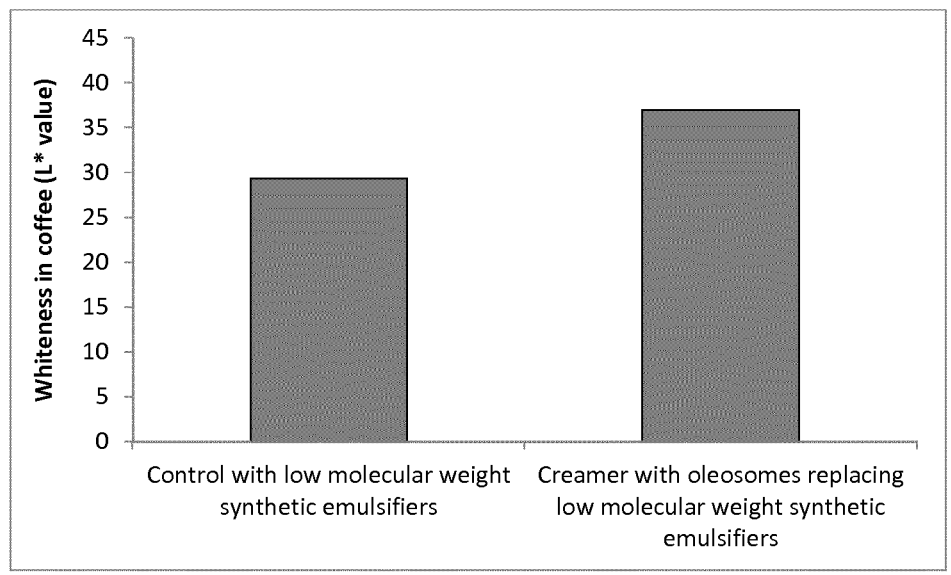

US 9,980,500 B2

LIQUID CREAMER COMPOSITION COMPRISING OLEOSOMES AS REPLACEMENT FOR OIL AND METHOD OF USING SAME

CROSS REFERENCE TO RELATED APPLICATIONS

The present application is a National Stage of International Application No. PCT/EP2014/056110, filed on Mar. 27, 2014, which claims priority to U.S. Provisional Application Ser. No. 61/806,183, filed on Mar. 28, 2013, and U.S. Provisional Application Ser. No. 61/806,181, filed on Mar. 28, 2013, the entire contents of which are being incorporated herein by reference.

FIELD OF THE INVENTION

The present invention relates to creamers that may be used as such or for adding to coffee, tea, and cocoa beverages, cereals, and to methods of producing creamers.

BACKGROUND

Creamers are widely used as whitening agents with hot and cold beverages such as, for example, coffee, cocoa, tea, etc. They are commonly used in place of milk and/or dairy cream. Creamers may come in a variety of different flavors and provide mouthfeel, body, and a smoother texture. Creamers can be in liquid or powder forms. A liquid creamer may be intended for storage at ambient temperatures or under refrigeration, and should be stable during storage without phase separation, creaming, gelation and sedimentation. The creamer should also retain a constant viscosity over time. When added to cold or hot beverages such a coffee or tea, the creamer should dissolve rapidly, provide a good whitening capacity, and remain stable with no feathering and/or sedimentation while providing a superior taste and mouthfeel.

Emulsions and suspensions are not thermodynamically stable, and there is a real challenge to overcome physicochemical instability issues in the liquid creamers that contain oil and other insoluble materials, especially for the aseptic liquid creamers during long storage times at ambient or elevated temperatures. Moreover, over time, creaming that can still be invisible in the liquid beverages stored at room and elevated temperatures can cause a plug in the bottle when refrigerated. Furthermore, chemical instability issues such as oxidation result in lower quality product and shorter shelf life.

Conventionally, low molecular emulsifiers, such as e.g. mono- and diglycerides, are added to non-dairy liquid creamers to ensure stability of the oil-in-water emulsion. Low molecular weight emulsifiers are effective stabilisers of the oil-in-water emulsion, but may be perceived as artificial by consumers. Hydrocolloids such as kappa-carrageenan, iota-carragenan, and/or lambda-carragenan; starch; cellulose, e.g. microcrystalline cellulose, methyl cellulose, or carboxy-methyl cellulose; agar-agar; gelatine; gellan (e.g., high acyl, low acyl); guar gum; gum Arabic; kojac; locust bean gum; pectin; sodium alginate; maltodextrin; tracaganth; xanthan; or a combination thereof may be used in liquid creamers to obtain desired mouthfeel and viscosity but have not been shown to produce sufficient emulsion stability to replace low molecular emulsifiers.

Modified starches are normally used in products where a high viscosity and a high degree of texture is desired, e.g. in instant desserts, pizza toppings, frozen foods, ice-cream, frozen cakes, dry mixes (cupcakes, muffins, cakes, cookies, self-saucing puddings), flavoured toppings and sauces, mayonnaises, snacks and muesli bars, and gravies.

Oil bodies obtained from oilseeds have been exploited for a variety of applications in biotechnology. These applications are based on their non-coalescing nature, ease of extraction and presence of unique membrane proteins oleosins. In suspension, oil bodies exist as separate entities and, hence, they may be used in a wide variety of products, ranging from vaccines, food, cosmetics and personal care products (S. C. Bhatla, V. Kaushik, and M. K. Yadav). Use of oil bodies and oleosins in recombinant protein production and other biotechnological applications is disclosed in Biotechnology Advances, 2010.

EP 0 986 309 B1 patent describes emulsions which comprise oil bodies. Disclosed is also a method for preparing the emulsions and the use of emulsions in high viscous products. These products have no issue with emulsion stability of the products, e.g. fat separation/creaming.

The above-discussed publications are silent about how to provide a stable product with demands such as low viscosity matrix, ability to dilute, perform at high temperature and in conditions from neutral to acid pH, and with high mineral content such as may be required for a liquid creamer.

In addition to the low molecular emulsifiers some non-dairy liquid creamers are made using addition of whitening agent/color (usually titanium dioxide) which is used in the creamer to provide a required whitening capacity when added to beverages (coffee, tea, and like). This is particular the case for fat free or low fat non-dairy liquid creamers. These whitening agents may be perceived as artificial by consumers. There is a need for alternative ingredients i.e. emulsifiers and colors, to provide stable product with required whitening capacity.

In view of the previous discussion, there are numerous challenges in creating a liquid creamer without low molecular emulsifiers, which is homogeneous, shelf-stable, and shows good physical and chemical stability.

SUMMARY OF THE INVENTION

In one embodiment, it was surprisingly found that oleosomes can be used to replace oil in liquid creamers and provides higher whitening capacity (when creamer is added to coffee). The oleosomes may replace preferably all of the oil in liquid creamer recipes. Accordingly in one embodiment, the present invention relates to a liquid creamer composition comprising protein from about 0.1% to about 3% by weight of the creamer composition, and oleosomes from about 0.5% to 15% by weight. In further embodiments, the invention relates to a method of producing a creamer composition of the invention as well as a method of preparing a beverage composition.

In another embodiment, it was surprisingly found that use of oleosomes can be used as an effective emulsifiers in liquid creamers, and provide a good physical stability without excessive viscosity. The oleosomes may replace some or all of the low molecular emulsifiers in liquid creamer. Accordingly in one embodiment, the present invention relates a liquid creamer composition comprising oil, protein and oleosomes. In further embodiments, the invention relates to a method of producing a creamer composition of the invention as well as a method of preparing a beverage composition.

It was found that oleosomes can be used to replace oil in liquid creamers providing higher whitening capacity (when creamer is added to coffee), and also providing the same particle size distribution of the emulsion droplets as compared to that of the control creamers containing oil which is stabilized by synthetic emulsifiers, while good emulsion stability is maintained.

Furthermore, it was found that liquid creamer compositions allow for more chemical stable product resistant to oxidation.

In addition, it was surprisingly found that the oleosomes extracts can be used to replace synthetic low molecular weight surfactants in full fat liquid creamers while maintaining good physical stability and whitening properties. Surprisingly, it was found, in particular that the oleosomes also provide a good whitening capacity of low fat liquid creamers when added to beverages such as coffee or tea. This allows avoiding the addition of artificial colors to the creamer such as TiO2. Moreover, the liquid creamer comprising oleosomes is found to be stable also after dilution in hot, neutral or acidic liquid, especially with high level of minerals when hard water is used to prepare coffee or tea. Furthermore, the use of oleosomes does not negatively affect taste/mouthfeel of the liquid creamers as well as of beverages with the creamers added. According to the invention a more natural product can thus be provided.

BRIEF DESCRIPTION OF THE DRAWINGS

FIG. 1 shows the whiteness capacity of the creamer of the instant invention when oleosomes are used in comparison to the use of synthetic emulsifiers.

DETAILED DESCRIPTION OF THE INVENTION

According to the present invention a creamer composition is provided which has a good physical stability without the need for low molecular emulsifiers. By physical stability is meant stability against phase separation, plug formation, flocculation and/or aggregation of fat due to fat crystallization and/or formation of an oil rich fraction in the upper part of the composition due to aggregation and/or coalescence of oil droplets, e.g. aggregation and/or coalescence of oil droplets to form a hard "plug" in the upper part of the product.

In addition to the above the present invention provides a liquid creamer composition with good chemical stability which is resistant to oxidation.

By a creamer composition is meant a composition that is intended to be added to a food composition, such as e.g. coffee or tea, to impart specific characteristics such as colour (e.g. whitening effect), thickening, flavour, texture, and/or other desired characteristics. A creamer composition of the invention is preferably in liquid form, but may also be in powdered form.

By oleosomes or oil bodies are meant a site of lipid storage in oilseeds. In plants lipids are stored mainly as triglycerides in the form of organelles called oleosomes or oil bodies that serve as energy during germination of the seeds. The oil bodies from different seeds of number of plant species have similar structure and composition. They consist of a core of triglycerides surrounded by a monolayer of phospholipids embedded with proteins called oleosins. The properties of the mixed phospholipid-oleosin layer at the surface of oleosomes, has been found to make them very stable against coalescence and thermal processing. These oleosomes can be extracted from different plant seeds such as soy, canola, sunflower, camelina, safflower, flaxseed, or germs such as corn germs using an aqueous process. In general, oleosome extract undergoes further treatment in order to produce the final product, i.e. free oil.

In an embodiment the creamer composition of comprises oleosomes extracted from plant seeds or germs or a combination thereof. In particular it is preferred that the oleosomes are extracted from plant seeds selected from the group consisting of soy seeds, canola seeds, sunflower seeds, camelina seeds, safflower seeds, flaxseed seeds, corn germs, or combination of thereof.

For the best mouthfeel, and physio-chemical properties as such and when added to hot coffee, the creamer composition comprises any of the preceding claims comprising between about 1% and about 15% oil. Preferably, the oil comprises a vegetable oil selected from the group consisting of canola, soybean, sunflower, safflower, cotton seed, palm oil, palm kernel oil, corn, and/or coconut, fractions of oils, and combinations of thereof.

In the present context a on full fat creamer comprises above 15% fat while a low fat creamer comprises below 15% lipids.

Further in the present context unless otherwise indicated % of a component means the of weight based on the weight of the creamer composition, i.e. weight/weight %.

In one embodiment of the invention the liquid creamer composition comprises oleosomes between about 0.005% and about 0.5% by weight of the creamer composition. The use of oleosomes in amount of less than 0.005%, results in phase separation such as creaming in the liquid creamer as is. Moreover, de-oiling was observed when the creamer was added to hot coffee. The use of oleosomes in amount of more than 0.5% did not provide further improvement in creamer whitening capacity.

In another embodiment of the invention the liquid creamer comprises oleosomes from about 0.5% to 15% by weight, preferably between about 2.5% and about 10% oleosomes by weight. The use of oleosomes in amount of less than 0.5%, may results in phase separation such as creaming in the liquid creamer as is. Moreover, de-oiling was observed when the creamer was added to hot coffee. The use of oleosomes in amount of more than 15% did not provide further improvement in creamer whitening capacity.

The liquid creamer composition of the invention preferably comprising between about 0.1% and about 3% protein by weight of the creamer composition. The use of proteins in amount of less than 0.1% did not provide stable emulsion in liquid creamers, while addition of proteins in amount above 3% resulted in sedimentation during storage.

It was surprisingly found that small amount of oleosomes performs as emulsifiers in liquid creamers avoiding the need to use low molecular wheight emulsifiers, e.g. synthetic mono-, di-glycerides, esters of mono- and diglycerides, sucrose esters of fatty acids. For example, an addition of 0.01, 0.1 or 0.5% of oleosomes to the creamer containing 2.5% oil (without addition of synthetic emulsifiers) results in better product stability as compared to that of the control without added oleosomes. Moreover, it was unexpectedly found that addition of small levels of oleosomes to liquid creamers increases creamer whitening capacity (when creamer is added to coffee) as compared to that of the control with the same level of total oil stabilized by synthetic emulsifier, but without addition of oleosomes (FIG. 1).

In one embodiment, oleosome is preferably present in the creamer composition of the invention in an amount of between about 0.005% and about 0.5% (weight/weight), such as between about 0.05% and about 0.4%, more preferably between about 0.1% and about 0.3%. If too little (less than 0.005%) oleosome is used, the physical stability of the liquid creamer composition is reduced, and phase separation occurs. Moreover, the creamer emulsion is not stable when the creamer is added to hot coffee, resulting in significantly lower whitening capacity.

Moreover, it was unexpectedly found that addition of small levels of oleosomes to liquid creamers increases creamer whitening capacity (when creamer is added to coffee) as compared to that of the control with the same level of total oil stabilized by synthetic emulsifier, but without addition of oleosomes.

Also, the chemical stability of the product is higher during the storage when oleosomes are used in the range of 0.5-15% as compared to that containing oils.

The creamer composition of the invention further comprises protein, preferably between about 0.1% (weight/weight) and about 3% protein, such as between about 0.2% (weight/weight) and about 2% protein, more preferably between about 0.5% (weight/weight) and about 1.5% protein. The protein may be any suitable protein, e.g. milk protein, such as casein, caseinate, and whey protein; vegetable protein, e.g. soy and/or pea protein; and/or combinations thereof. The protein is preferably sodium caseinate. The protein in the composition may work as an emulsifier, but may also provide texture, and/or provide whitening effect. Too low levels of protein reduce the stability of the liquid creamer and creaming may occur. At high protein levels phase separation occurs in creamer as is and especially when the creamer is added to hot coffee. Moreover, high level of proteins cause feathering when added to coffee prepared with hard water.

The weight ratio between protein and oleosomes is preferably between about 0.007:1 and about 6:1 If the protein to oleosomes ratio is below 0.007:1, de-oiling may occur when added to coffee, while if the ratio is above 6:1, sedimentation will occur.

In a embodiment of the invention the creamer composition comprising pure oleosomes comprising lipid fraction from about 90% to about 99% by weight of the oleosomes and protein fraction from about 0.5% to about 10% by weight of the oleosomes.

In another embodiment the creamer composition comprising crude oleosomes comprising: lipid fraction from about 30% to about 90% by weight of the crude oleosomes; protein fraction from about 10% to about 25% by weight of the crude oleosomes; carbohydrate fraction from about 0% to about 40% by weight of the crude oleosomes, and mineral fraction from about 0% to about 10% by weight of the crude oleosomes.

The use of pure oleosomes increase creamer stability, while using crude oleosomes also increases creamer whitening capacity when added to coffee.

In one embodiment of the invention, the creamer composition is devoid of added low molecular weight emulsifiers. By a low molecular weight emulsifier is meant an emulsifier with a molecular weight below about 1500 g/mol. Emulsions are thermodynamically unstable, and the phases of an emulsion will separate with time. By an emulsifier is meant a compound that stabilises the interface between the two phases of the oil-in-water emulsion and reduces the rate of phase separation. By the term "devoid of added low molecular emulsifiers" is meant that the creamer composition does not contain any low molecular emulsifiers which have been added in amounts sufficient to substantially affect the stability the emulsion. A creamer composition devoid of added low molecular emulsifiers may contain minor amounts of low molecular emulsifiers which do not substantially affect the stability of the emulsion, but which are present e.g. as minor impurities of one or more of the ingredients of the creamer composition.

Low molecular weight emulsifiers include, but are not limited to, monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, diacetylated tartaric acid esters of monoglycerides and diglycerides, succinic acid esters of mono- and diglycerides, lactic acid esters of mono- and diglycerides, lecithins, lysolecitins, and sucrose esters of fatty acids.

In one embodiment a creamer composition according to the invention is devoid of added monoglycerides, diglycerides, acetylated monoglycerides, sorbitan trioleate, glycerol dioleate, sorbitan tristearate, propyleneglycol monostearate, glycerol monooleate and monostearate, sorbitan monooleate, propylene glycol monolaurate, sorbitan monostearate, sodium stearoyl lactylate, calcium stearoyl lactylate, glycerol sorbitan monopalmitate, diacetylated tartaric acid esters of monoglycerides and diglycerides, succinic acid esters of mono- and diglycerides, lactic acid esters of mono- and/or diglycerides, and sucrose esters of fatty acids.

In a further embodiment of the invention, the creamer composition is devoid of added lecithin and lysolecithins, including lecithin and/or lysolecithin derived from soy, canola, sunflower, and/or safflower.

In one embodiment, the creamer composition of the invention comprises oil. The oil may be any oil, or combination oils, suitable for use in a liquid creamer. The oil is preferably a vegetable oil, such as e.g. oil from canola, soy bean, sunflower, safflower, cotton seed, palm oil, palm kernel oil, corn, and/or coconut. In one such embodiment the creamer composition comprising oil further comprises an oleosomes in the range of about 0.05% to 0.5% by weight of the creamer composition. The advantage of such a composition is that oleosomes play the role of an emulsifier and thus there is no requirement to add other synthetic emulsifiers to the creamer.

In another embodiment, the creamer composition of the invention is devoid of added oil or other lipids than that of oleosomes. The oil may be any oil, or combination oils, suitable for use in a liquid creamer. The oil is preferably a vegetable oil, such as e.g. oil from canola, soy bean, sunflower, safflower, cotton seed, palm oil, palm kernel oil, corn, and/or coconut.

The creamer composition of the present invention may further include a buffering agent.

The buffering agent can prevent undesired creaming or precipitation of the creamer upon addition into a hot, acidic environment such as coffee. The buffering agent can e.g. be monophosphates, diphosphates, sodium mono- and bicarbonates, potassium mono- and bicarbonates, or a combination thereof preferred buffers are salts such as potassium phosphate, dipotassium phosphate, potassium hydrophosphate, sodium bicarbonate, sodium citrate, sodium phosphate, disodium phosphate, sodium hydrophosphate, and sodium tripolyphosphate. The buffer may e.g. be present in an amount of about 0.1 to about 1% by weight of the liquid creamer.

The creamer composition of the present invention may further include one or more additional ingredients such as flavors, sweeteners, colorants, antioxidants (e.g. lipid antioxidants), or a combination thereof. Sweeteners can include, for example, sucrose, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination.

Usage level of the flavors, sweeteners and colorants will vary greatly and will depend on such factors as potency of the sweetener, desired sweetness of the product, level and type of flavor used and cost considerations. Combinations of sugar and/or sugarless sweeteners may be used. In one embodiment, a sweetener is present in the creamer composition of the invention at a concentration ranging from about 5% to about 40% by weight. In another embodiment, the sweetener concentration ranges from about 25% to about 30% by weight.

The invention further relates to a method of producing a creamer composition of the invention. The method comprises providing a composition, the composition comprising water, protein and oleosome, and optionally additional ingredients as disclosed herein; and homogenising the composition to produce a creamer composition. Before homogenisation, optional compounds such as, hydrocolloids, buffers, sweeteners and/or flavors may be hydrated in water (e.g., at between 40° C. and 90° C.) under agitation, with addition of melted oil if desired. The method may further comprise heat treating the composition before homogenisation, e.g. by aseptic heat treatment. Aseptic heat treatment may e.g. use direct or indirect UHT processes. UHT processes are known in the art. Examples of UHT processes include UHT sterilization and UHT pasteurization. Direct heat treatment can be performed by injecting steam into the emulsion. In this case, it may be necessary to remove excess water, for example, by flashing. Indirect heat treatment can be performed with a heat transfer interface in contact with the emulsion. The homogenization may be performed before and/or after heat treatment. It may be advantageous to perform homogenization before heat treatment if oil is present in the composition, in order to improve heat transfers in the emulsion, and thus achieve an improved heat treatment. Performing a homogenization after heat treatment usually ensures that the oil droplets in the emulsion have the desired dimension. After heat treatment the product may be filled into any suitable packaging, e.g. by aseptic filling. Aseptic filling is described in various publications, such as articles by L, Grimm in "Beverage Aseptic Cold Filling" (Fruit Processing, July 1998, p. 262-265), by R. Nicolas in "Aseptic Filling of UHT Dairy Products in HDPE Bottles" (Food Tech. Europe, March/April 1995, p. 52-58) or in U.S. Pat. No. 6,536,188 to Taggart, which are incorporated herein by reference. In an embodiment, the method comprises heat treating the liquid creamer before filling the container. The method can also comprise adding a buffering agent in amount ranging from about 0.1% to about 1.0% by weight to the liquid creamer before homogenizing the liquid creamer. The buffering agent can be one or more of sodium mono- and di-phosphates, potassium mono- and di-phosphates, sodium mono- and bi-carbonates, potassium mono- and bi-carbonates or a combination thereof. As an alternative to the Aseptic filling, Extended Shelf Life treatment can be used should the products be stored only at refrigeration (usually up to 6 months), while with aseptic filling the product can be stored at ambient temperatures.

The creamer, when added to a beverage, produces a physically stable, homogeneous, whitened drink with a good mouthfeel, and body, smooth texture, and a pleasant taste with no off-flavors notes. The use of the creamer of the invention is not limited for only coffee applications. For example, the creamer can be also used for other beverages, such as tea or cocoa, or used with cereals or berries, as a creamer for soups, and in many cooking applications, etc.

A liquid creamer of the invention is preferably physically stable and overcome phase separation issues (e.g., creaming, plug formation, gelation, syneresis, sedimentation, etc.) during storage at refrigeration temperatures (e.g., about 4° C.), room temperatures (e.g., about 20° C.) and elevated temperatures (e.g., about 30 to 38° C.). The stable liquid creamers can have a shelf-life stability such as at least 6 months at 4° C. and/or at 20° C., 6 months at 30° C., and 1 month at 38° C. Stability may be evaluated by visual inspection of the product after storage.

The invention in an even further aspect relates to a beverage composition comprising a creamer composition as disclosed above. A beverage composition may e.g. be a coffee, tea, malt, cereal or cocoa beverage. A beverage composition may be liquid or in powder form. Accordingly, the invention relates to a beverage composition comprising a) a creamer composition of the invention, and b) a coffee, tea, malt, cereal, or cocoa product, e.g. an extract of coffee, tea, malt, or cocoa. If the beverage composition is in liquid form it may e.g. be packaged in cans, glass bottles, plastic bottles, or any other suitable packaging. The beverage composition may be aseptically packaged. The beverage composition may be produced by a method comprising a) providing a beverage composition base; and b) adding a creamer composition according to the invention to the beverage composition base. By a beverage composition base is understood a composition useful for producing a beverage by addition of a creamer of the invention. A beverage composition base may in itself be suitable for consumption as a beverage. A beverage composition base may e.g. be an extract of coffee, tea, malt, or cocoa.

A liquid creamer of the invention has good whitening capacity and is also stable (without feathering, de-oiling, other phase separation defects) when added to hot beverages (coffee, tea and like), even when coffee is made with hard water, and also provides good mouthfeel.

EXAMPLES

By way of example and not limitation, the following examples are illustrative of various embodiments of the present disclosure.

Example 1 (Control)

A dry blend of carrageenans with sucrose was prepared by mixing together 1250 g of sucrose with 3.5 g of the carrageenan). The dry blend was added into 2500 g of hot water (~75° C.) under high agitation. Then, 20 g of di-potassium phosphate and 15 g of sodium caseinate were added to the tank under continuous agitation.

After ~15 minutes of mixing, emulsifiers 20 g of mono- and di-glyceride emulsifiers were added into the tank under continuous high agitation. Further, 120 g vegetable oil was added under high agitation. Remain water was added to adjust the total product amount to 5000 g. The liquid was pre-heated, UHT treated for 3 sec at 143° C., homogenized at 135/35 bar, cooled and the liquid creamer was aseptically filled into bottles.

Physico-chemical stability and sensory of creamer and coffee beverage with added liquid creamer was judged by technical panel. It was found that the liquid creamer has good appearance. Thus, no phase separation (creaming, de-oiling, marbling, etc.) and gelation of the liquid creamers were observed. It was found that the liquid creamer has good appearance. Also a good mouth-feel, smooth texture and a good flavor without "off" taste were found when added to coffee.

Example 2

A coffee whitener was prepared as in Example 1 but using 130 g of oleosomes.

Physico-chemical stability and sensory of creamer and coffee beverage with added liquid creamer was judged by technical panel. It was found that the liquid creamer has good appearance, i.e. no phase separation such as creaming, de-oiling, marbling and gelation of the liquid creamers were observed. Also a good mouth-feel and smooth texture were found when added to coffee.

Example 3

A coffee whitener was prepared as in Example 2 but using 2.5 g of protein and 750 g of oleosomes.

Phase separation such as creaming was observed in the liquid creamer as is. Moreover, de-oiling was observed when the creamer was added to hot coffee.

Example 4

A coffee whitener was prepared as in Example 1 but using 200 g of protein and 25 g of oleosomes.

Physico-chemical stability and sensory of creamer and coffee beverage with added liquid creamer was judged by technical panel. High level of sediment was observed in the liquid creamer.

Example 5

A dry blend of kappa- and iota-carrageenans with sucrose was prepared by mixing together 1250 g of sucrose with 3.5 g of the carrageenan). The dry blend was added into 2500 g of hot water (~75° C.) under high agitation. Then, 20 g of di-potassium phosphate and 15 g of sodium caseinate were added to the tank under continuous agitation.

After ~15 minutes of mixing, 15 g of oleosomes were added into the tank under continuous high agitation. Further, 110 g vegetable oil was added under high agitation. Remain water was added to adjust the total product amount to 5000 g. The liquid was pre-heated, UHT treated for 3 sec at 143° C., homogenized at 135/35 bar, cooled and the liquid creamer was aseptically filled into bottles.

Physico-chemical stability and sensory of creamer and coffee beverage with added liquid creamer was judged by technical panel. It was found that the liquid creamer has good appearance. Thus, no phase separation (creaming, de-oiling, marbling, etc.) and gelation of the liquid creamers were observed. Also a good mouth-feel, smooth texture and a good flavor without "off" taste were found when added to coffee. Moreover, replacing the low molecular weight emulsifiers (as compared to Example 1) by the oleosomes increased creamer whitening capacity when added to a coffee (see FIG. 1).

Example 6

A coffee whitener was prepared as in Example 5 but using 90 g of oleosomes and 66 g of vegetable oil.

Also a good mouth-feel, smooth texture and a good flavor without "off" taste were found when added to coffee. However, no improvement in creamer whitening capacity was found when added to a coffee as compared to that of Example 2.

Example 7

A coffee whitener was prepared as in Example 5 but using 0.02 g of oleosomes.

Physico-chemical stability and sensory of creamer and coffee beverage with added liquid creamer was judged by technical panel. Phase separation such as creaming was observed in the liquid creamer as is. Moreover, de-oiling was observed when creamer added to hot coffee. Further, whitening capacity of the creamer was found lower as compared to that of Example 5.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A liquid creamer composition comprising oleosomes at a level from about 0.5% to 15% by weight of the liquid creamer composition, the liquid creamer composition further comprising protein added to the oleosomes at a level from about 0.1% to about 3% by weight of the liquid creamer composition, the liquid creamer composition has been UHT-treated, and the liquid creamer composition is devoid of added low molecular weight emulsifiers and devoid from other lipids than that of the oleosomes.

2. The liquid creamer composition of claim 1 wherein the oleosomes are between about 2.5% and about 10% by weight of the liquid creamer composition.

3. The liquid creamer composition of claim 1 wherein the weight ratio between the protein added to the oleosomes and the oleosomes is between about 0.007:1 and about 6:1.

4. The liquid creamer composition of claim 1 wherein the oleosomes comprise:
   lipid fraction at a level from about 90% to about 99% by weight of the oleosomes; and
   protein fraction at a level from about 0.5% to about 10% by weight of the oleosomes.

5. The liquid creamer composition of claim 1 wherein the oleosomes comprise:
   lipid fraction at a level from about 30% to about 90% by weight of the oleosomes;
   protein fraction at a level from about 10% to about 25% by weight of the oleosomes;
   carbohydrate fraction at a level from about 0% to about 40% by weight of the oleosomes; and
   mineral fraction at a level from about 0% to about 10% by weight of the oleosomes.

6. A liquid creamer composition comprising oil and protein and further comprising oleosomes, the liquid creamer composition has been UHT-treated, and the liquid creamer composition is devoid of added low molecular weight emulsifiers, the oil is between about 1 wt. % and about 15 wt. % of the liquid creamer composition, and the oleosomes are between about 0.005 wt. % and about 0.5 wt. % of the liquid creamer composition.

7. The liquid creamer composition of claim 1, wherein the oleosomes are extracted from seeds or germs selected from the group consisting of soy seeds, canola seeds, sunflower seeds, camelina seeds, safflower seeds, flaxseed seeds, corn germs, and a combination thereof.

8. A beverage composition comprising a creamer composition comprising oleosomes at a level from about 0.5% to 15% by weight of the creamer composition, the creamer composition further comprising protein added to the oleosomes at a level from about 0.1% to about 3% by weight of the creamer composition, the creamer composition has been UHT-treated, and the creamer composition is devoid of added low molecular weight emulsifiers.

9. The beverage composition of claim 8 wherein the beverage is selected from the group consisting of a coffee beverage, a tea beverage, a malt beverage, a cereal beverage, and a cocoa beverage.

10. A method of producing a liquid creamer composition, the method comprising:
providing a composition comprising water and protein and further comprising olesomes;
homogenising the composition to produce a creamer composition;
performing UHT treatment on the creamer composition; and
filling the UHT-treated creamer composition into a package, and the UHT-treated creamer composition is devoid of added low molecular weight emulsifiers and devoid from other lipids than that of the oleosomes.

11. A method of preparing a beverage composition, the method comprising:
providing a beverage composition base; and
adding a liquid creamer composition to the beverage composition base, the liquid creamer composition comprising oleosomes at a level from about 0.5% to 15% by weight of the liquid creamer composition, the liquid creamer composition further comprising protein added to the oleosomes at a level from about 0.1% to about 3% by weight of the creamer composition, the liquid creamer composition has been UHT-treated, and the liquid creamer composition is devoid of added low molecular weight emulsifiers.

12. The method of claim 11 wherein the beverage composition is selected from the group consisting of a coffee beverage, a tea beverage, a malt beverage, a cereal beverage, and a cocoa beverage.

13. The liquid creamer composition of claim 6, wherein the oleosomes are extracted from seeds or germs selected from the group consisting of soy seeds, canola seeds, sunflower seeds, camelina seeds, safflower seeds, flaxseed seeds, corn germs, and a combination thereof.

14. The liquid creamer composition of claim 1 wherein the liquid creamer composition has a shelf-life stability of at least 6 months at 4° C., at least 6 months at 20° C., at least 6 months at 30° C., and at least 1 month at 38° C.

15. The liquid creamer composition of claim 6 wherein the liquid creamer composition has a shelf-life stability of at least 6 months at 4° C., at least 6 months at 20° C., at least 6 months at 30° C., and at least 1 month at 38° C.

16. The method of claim 10 wherein the UHT-treated creamer composition has a shelf-life stability of at least 6 months at 4° C., at least 6 months at 20° C., at least 6 months at 30° C., and at least 1 month at 38° C.

17. The method of claim 11 wherein the liquid creamer composition has a shelf-life stability of at least 6 months at 4° C., at least 6 months at 20° C., at least 6 months at 30° C., and at least 1 month at 38° C.

* * * * *